US012476341B2

(12) United States Patent
Kikitsu et al.

(10) Patent No.: US 12,476,341 B2
(45) Date of Patent: Nov. 18, 2025

(54) ELECTROMAGNETIC WAVE ATTENUATOR AND ELECTRONIC DEVICE

(71) Applicant: KABUSHIKI KAISHA TOSHIBA, Tokyo (JP)

(72) Inventors: Akira Kikitsu, Yokohama Kanagawa (JP); Yoshinari Kurosaki, Kawasaki Kanagawa (JP); Satoshi Shirotori, Yokohama Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 556 days.

(21) Appl. No.: 17/876,132

(22) Filed: Jul. 28, 2022

(65) Prior Publication Data

US 2023/0145220 A1    May 11, 2023

(30) Foreign Application Priority Data

Nov. 9, 2021 (JP) .................. 2021-182265

(51) Int. Cl.
*H01P 1/23* (2006.01)
*G11B 5/39* (2006.01)
(Continued)

(52) U.S. Cl.
CPC .............. *H01P 1/23* (2013.01); *G11B 5/3909* (2013.01); *H01L 23/552* (2013.01); *H01P 1/22* (2013.01);
(Continued)

(58) Field of Classification Search
CPC ... G11B 5/3903; G11B 5/3906; G11B 5/3909; H01L 23/552; H01L 2924/3025;
(Continued)

(56) References Cited

U.S. PATENT DOCUMENTS 6,292,334 B1 * 9/2001 Koike .................. G11B 5/3903
2003/0049498 A1    3/2003 Shimosato
(Continued)

FOREIGN PATENT DOCUMENTS

| CN | 113453523 A * | 9/2021 | ............. C23C 14/14 |
| JP | 2003115106 A * | 4/2003 | ........... G11B 5/7325 |

(Continued)

OTHER PUBLICATIONS

Japan Patent Office, Office Action in JP App. No. 2021-182265, 2 pages, and machine translation, 4 pages (Sep. 30, 2024).

*Primary Examiner* — Matthew E Warren
(74) *Attorney, Agent, or Firm* — Finnegan, Henderson, Farbow, Garrett & Dunner, LLP

(57) ABSTRACT

According to one embodiment, an electromagnetic wave attenuator includes a stacked member including a first planar portion. The first planar portion includes a first stacked body. The first stacked body includes a plurality of non-magnetic layers including Cr and Ti, and a plurality of first magnetic layers. A direction from one of the first magnetic layers to another one of the first magnetic layers is along a first direction. One of the non-magnetic layers is between the one of the first magnetic layers and the other one of the first magnetic layers. The one of the first non-magnetic layers includes an amorphous region. The one of the first magnetic layers and the other one of the first magnetic layers include a crystal region.

19 Claims, 15 Drawing Sheets

(51) Int. Cl.
  *H01L 23/552* (2006.01)
  *H01P 1/22* (2006.01)
  *H05K 9/00* (2006.01)
  *H10B 61/00* (2023.01)
  *H10N 50/10* (2023.01)
(52) U.S. Cl.
  CPC ........... *H01P 1/222* (2013.01); *H05K 9/0026* (2013.01); *H05K 9/0031* (2022.08); *H10B 61/22* (2023.02); *H10N 50/10* (2023.02)
(58) Field of Classification Search
  CPC ... H01P 1/22; H01P 1/222; H01P 1/23; H05K 9/0024; H05K 9/0026; H05K 9/003; H05K 9/0031; H05K 2201/10371; H10B 61/00; H10B 61/22; H10N 50/10
  See application file for complete search history.

(56) References Cited

U.S. PATENT DOCUMENTS

| | | | |
|---|---|---|---|
| 2004/0018390 A1 | 1/2004 | Shimosato | |
| 2011/0062537 A1* | 3/2011 | Oh | G11C 11/16 257/E29.323 |
| 2012/0023386 A1* | 1/2012 | Oh | H10N 50/10 714/E11.053 |
| 2015/0162378 A1* | 6/2015 | Carey | H10N 50/10 257/421 |
| 2018/0337139 A1 | 11/2018 | Kikitsu et al. | |
| 2019/0081007 A1 | 3/2019 | Iwasaki et al. | |
| 2020/0066608 A1 | 2/2020 | Kikitsu et al. | |
| 2020/0227358 A1 | 7/2020 | Kikitsu et al. | |
| 2020/0243457 A1 | 7/2020 | Kikitsu et al. | |

FOREIGN PATENT DOCUMENTS

| | | | | |
|---|---|---|---|---|
| JP | 2012-33764 A | 2/2012 | | |
| JP | 2012-38807 A | 2/2012 | | |
| JP | 2018-195660 A | 12/2018 | | |
| JP | 2019-54059 A | 4/2019 | | |
| JP | 2020-31188 A | 2/2020 | | |
| JP | 2020113650 A | * | 7/2020 | ............ H01F 10/14 |
| JP | 2020-120066 A | 8/2020 | | |
| KR | 20200087710 A | * | 7/2020 | ........... H01L 23/552 |

* cited by examiner

ELECTROMAGNETIC WAVE ATTENUATOR AND ELECTRONIC DEVICE

CROSS-REFERENCE TO RELATED APPLICATIONS

This application is based upon and claims the benefit of priority from Japanese Patent Application No. 2021-182265, filed on Nov. 9, 2021; the entire contents of which are incorporated herein by reference.

FIELD

Embodiments described herein relate generally to an electromagnetic wave attenuator and an electronic device.

BACKGROUND

For example, an electromagnetic wave attenuator such as an electromagnetic shield sheet or the like has been proposed. There is an electronic device that includes the electromagnetic wave attenuator and a semiconductor element. It is desirable that the electromagnetic wave attenuator stably attenuates the electromagnetic wave.

DETAILED DESCRIPTION

Figure 1:
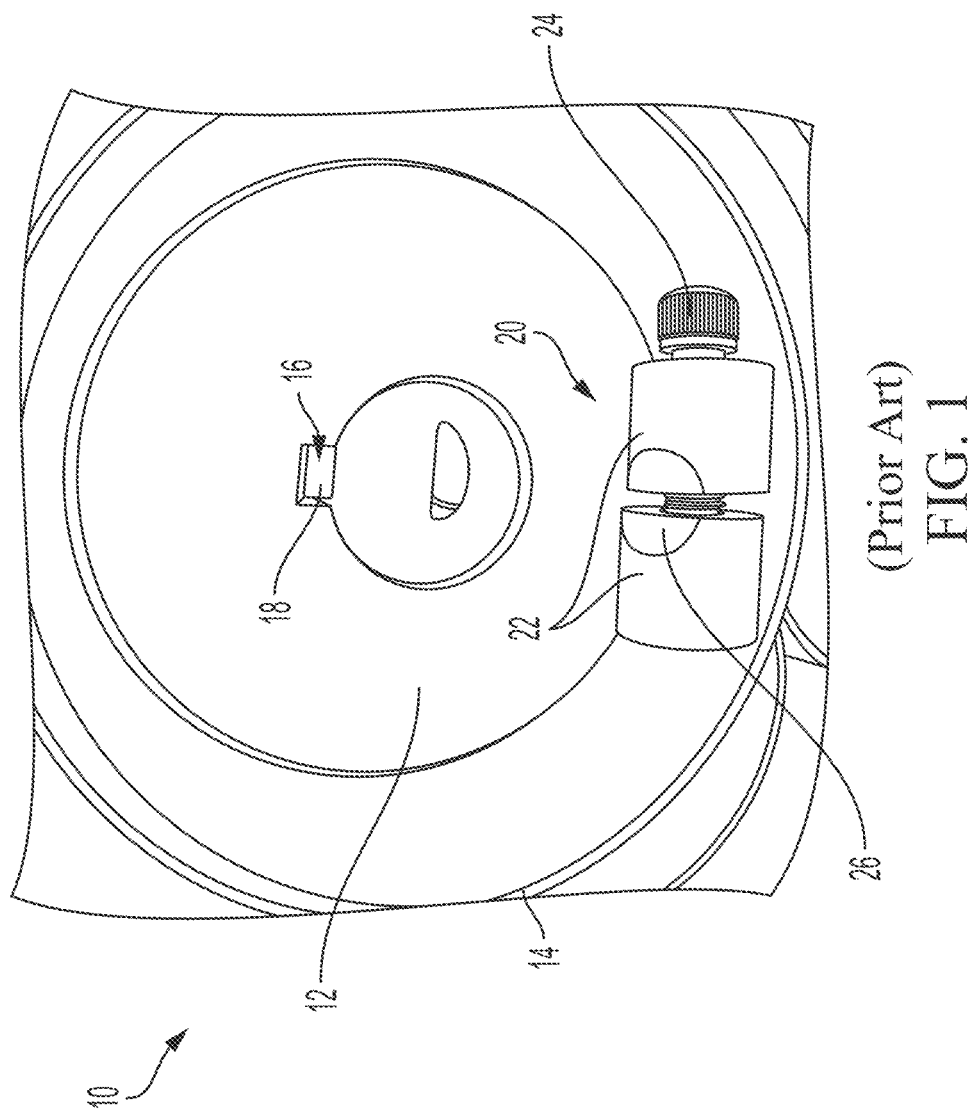
FIG. 1 is a schematic cross-sectional view illustrating an electromagnetic wave attenuator according to a first embodiment.

According to one embodiment, an electromagnetic wave attenuator includes a stacked member including a first planar portion. The first planar portion includes a first stacked body. The first stacked body includes a plurality of non-magnetic layers including Cr and Ti, and a plurality of first magnetic layers. A direction from one of the first magnetic layers to another one of the first magnetic layers is along a first direction. One of the non-magnetic layers is between the one of the first magnetic layers and the other one of the first magnetic layers. The one of the first non-magnetic layers includes an amorphous region. The one of the first magnetic layers and the other one of the first magnetic layers include a crystal region.

According to another embodiment, an electronic device includes the electromagnetic wave attenuator described above, and an electronic element.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic cross-sectional view illustrating an electromagnetic wave attenuator according to a first embodiment.

As shown in FIG. 1, the electromagnetic wave attenuator 10 according to the embodiment includes a stacked member 10MA. The stacked member 10MA includes a first planar portion 10p.

The first planar portion 10p includes the first stacked body 10M. The first stacked body 10M includes multiple first magnetic layers 11 and multiple first non-magnetic layers 11N. The multiple first non-magnetic layers 11N include Cr and Ti. For example, the multiple first non-magnetic layers 11N include alloys including Cr and Ti.

A direction from one of the multiple first magnetic layers 11 to another one of the multiple first magnetic layers 11 is along a first direction D1. One of the multiple first non-magnetic layers 11N is between one of the multiple first magnetic layers 11 and another one of the multiple first magnetic layers 11. For example, one of the multiple first magnetic layers 11 is between one of the multiple first non-magnetic layers 11N and another one of the multiple first non-magnetic layers 11N.

The first direction D1 is defined as a Z-axis direction. One direction perpendicular to the Z-axis direction is defined as an X-axis direction. A direction perpendicular to the Z-axis direction and the X-axis direction is defined as a Y-axis direction.

The multiple first magnetic layers 11 and the multiple first non-magnetic layers 11N are, for example, layered along an X-Y plane. The multiple first magnetic layers 11 and the multiple first non-magnetic layers 11N are arranged alternately along the Z-axis direction, for example.

In the embodiment, one of the multiple first non-magnetic layers 11N includes an amorphous region. One of the multiple first magnetic layers 11 and another one of the multiple first magnetic layers 11 include a crystal region.

With such an electromagnetic wave attenuator 10, the electromagnetic wave attenuation characteristic can be improved. An example of the experimental results regarding the characteristics of the electromagnetic wave attenuator will be described later.

As shown in FIG. 1, the electromagnetic wave attenuator 10 may include a base body 10s. A direction from the base body 10s to the first planar portion 10p is along the first direction D1. For example, the multiple first magnetic layers 11 and the multiple first non-magnetic layers 11N are alternately formed on the base body 10s.

The base body 10s may include a resin. In one example, the base body 10s is a mold resin or the like. In another example, the base body 10s may be a resin layer or the like. The resin layer is provided on, for example, a plastic sheet. In the embodiment, the surface of the base body 10s may have unevenness. In this case, the multiple first magnetic layers 11 and the multiple first non-magnetic layers 11N may have an uneven shape along the uneven surface of the base body 10s.

As shown in FIG. 1, for example, at least one of the multiple first magnetic layers 11 and the multiple first non-magnetic layers 11N may be grounded. For example, an electromagnetic wave is incident on the electromagnetic wave attenuator 10. The electromagnetic wave incident on the electromagnetic wave attenuator 10 is attenuated by the electromagnetic wave attenuator 10. The electromagnetic wave attenuator 10 can be used as, for example, a shield of an electromagnetic wave.

As shown in FIG. 1, one of the multiple first non-magnetic layers 11N is in contact with one of the multiple first magnetic layers 11 and another one of the multiple first magnetic layers 11. A thickness of one of the multiple first non-magnetic layers 11N along the first direction D1 is defined as a thickness t11N. The thickness t11N is, for example, not less than 1 nm and not more than 10 nm. A thickness of one of the multiple first magnetic layers 11 along the first direction D1 is defined as a thickness t11. The thickness t11 is, for example, not less than 10 nm and not more than 500 nm.

The multiple first magnetic layers 11 include at least one selected from the group consisting of Fe, Ni and Co. The multiple first magnetic layers 11 are, for example, soft magnetic layers. The multiple first magnetic layers 11 may further include at least one selected from the group consisting of, for example, Cu, Mo and Cr. In one example, the multiple first magnetic layers 11 are, for example, NiFeCuMo layers.

In the first stacked body 10M, the number of the multiple first magnetic layers 11 may be the same as the number of the multiple first non-magnetic layers 11N, may be 1 larger than the number of the multiple first non-magnetic layers 11N, or may be 1 smaller than the number of the multiple first non-magnetic layers 11N. For example, the number of the multiple first magnetic layers 11 is, for example, not less than 2 and not more than 200. The number of the multiple first non-magnetic layers 11N is, for example, not less than 2 and not more than 200.

As described below, in the embodiment, the first planar portion 10p may include another stacked body in addition to the first stacked body 10M.

Figure 2:
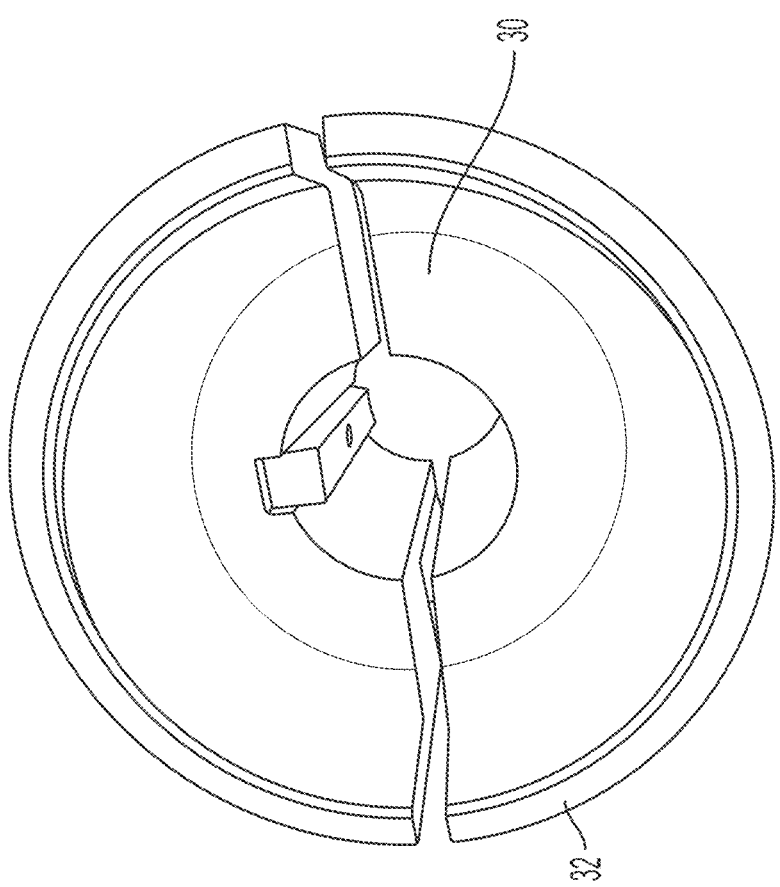
FIG. 2 is a schematic cross-sectional view illustrating an electromagnetic wave attenuator according to the first embodiment.

FIG. 2 is a schematic cross-sectional view illustrating an electromagnetic wave attenuator according to the first embodiment.

As shown in FIG. 2, in the electromagnetic wave attenuator 10A according to the embodiment, the first planar portion 10p further includes the second stacked body 20M. The direction from the first stacked body 10M to the second stacked body 20M is along the first direction D1. The second stacked body 20M includes multiple second magnetic layers 12 and multiple second non-magnetic layers 12N. The multiple second non-magnetic layers 12N include Cu. In the electromagnetic wave attenuator 10A, the configuration of the first stacked body 10M may be the same as the configuration of the first stacked body 10M in the electromagnetic wave attenuator 10.

A direction from one of the multiple second magnetic layers 12 to another of the multiple second magnetic layers 12 is along the first direction D1. One of the multiple second non-magnetic layers 12N is between one of the multiple second magnetic layers 12 and another one of the multiple second magnetic layers 12. For example, one of the multiple second magnetic layers 12 is between one of the multiple second non-magnetic layers 12N and another one of the multiple second non-magnetic layers 12N. The multiple second magnetic layers 12 and the multiple second non-magnetic layers 12N are, for example, layered along the X-Y plane. The multiple second magnetic layers 12 and the multiple second non-magnetic layers 12N are arranged alternately along the Z-axis direction, for example.

One of the multiple second non-magnetic layers 12N is in contact with one of the multiple second magnetic layers 12 and another of the multiple second magnetic layers 12. A thickness t12N of one of the multiple second non-magnetic layers 12N along the first direction D1 is, for example, not less than 50 nm and not more than 200 nm. A thickness t12 of one of the multiple second magnetic layers 12 along the first direction D1 is, for example, not less than 50 nm and not more than 200 nm.

The multiple second magnetic layers 12 include at least one selected from the group consisting of Fe, Ni and Co. The multiple second magnetic layers 12 are, for example, soft magnetic layers. The multiple second magnetic layers 12 may further include at least one selected from the group consisting of, for example, Cu, Mo and Cr. In one example, the multiple second magnetic layers 12 are, for example, NiFeCuMo layers.

In the second stacked body 20M, the number of the multiple second magnetic layers 12 may be the same as the number of the multiple second non-magnetic layers 12N, may be 1 larger than the number of the multiple second non-magnetic layers 12N, or may be 1 smaller than the number of the multiple second non-magnetic layers 12N. For example, the number of the multiple second magnetic layers 12 is, for example, not less than 2 and not more than 100. The number of the multiple second non-magnetic layers 12N is, for example, not less than 2 and not more than 100 or less.

In one example, the second stacked body 20M is provided between the base body 10s and the first stacked body 10M. In the embodiment, the first stacked body 10M may be provided between the base body 10s and the second stacked body 20M.

In this example, the first planar portion 10p further includes a third stacked body 30M. The third stacked body 30M includes multiple third magnetic layers 13 and multiple third non-magnetic layers 13N. The direction from one of the multiple third magnetic layers 13 to another one of the multiple third magnetic layers 13 is along the first direction D1. One of the multiple third non-magnetic layers 13N is between one of the multiple third magnetic layers 13 and another one of the multiple third magnetic layers 13. For example, one of the multiple third magnetic layers 13 is between one of the multiple third non-magnetic layers 13N and another one of the multiple third non-magnetic layers 13N. The multiple third non-magnetic layers 13N include at least one selected from the group consisting of Cr, Cu, Ta, Ti, W, Mo, Nb and Hf. In one example, the multiple third non-magnetic layers 13N are Ta layers. In another example, the multiple third non-magnetic layers 13N are alloy layers including Cr and Ti.

One of the multiple third non-magnetic layers 13N is in contact with one of the multiple third magnetic layers 13 and another one of the multiple third magnetic layers 13. A thickness t13N of one of the multiple third non-magnetic layers 13N along the first direction D1 is, for example, not less than 50 nm and not more than 200 nm. A thickness t13 of one of the multiple third magnetic layers 13 along the first direction D1 is, for example, not less than 50 nm and not more than 500 nm.

The multiple third magnetic layers 13 include at least one selected from the group consisting of Fe, Ni and Co. The multiple third magnetic layers 13 are, for example, soft magnetic layers. The multiple third magnetic layers 13 may further include at least one selected from the group consisting of, for example, Cu, Mo and Cr. In one example, the multiple third magnetic layers 13 are, for example, NiFeCuMo layers.

In the third stacked body 30M, the number of the multiple third magnetic layers 13 may be the same as the number of the multiple third non-magnetic layers 13N, and may be 1 larger, or may be 1 smaller. For example, the number of the multiple third magnetic layers 13 is, for example, not less than 2 and not more than 100. The number of the multiple third non-magnetic layers 13N is, for example, not less than 2 and not more than 100.

For example, at least one of the multiple third non-magnetic layers 13N may include an amorphous region. One of the multiple third magnetic layers 13 and another one of the multiple third magnetic layers 13 may include a crystal region.

The order in which the first stacked body 10M, the second stacked body 20M, and the third stacked body 30M are arranged is arbitrary.

An example of the experimental result regarding the electromagnetic wave attenuator will be described below.

Figure 3:
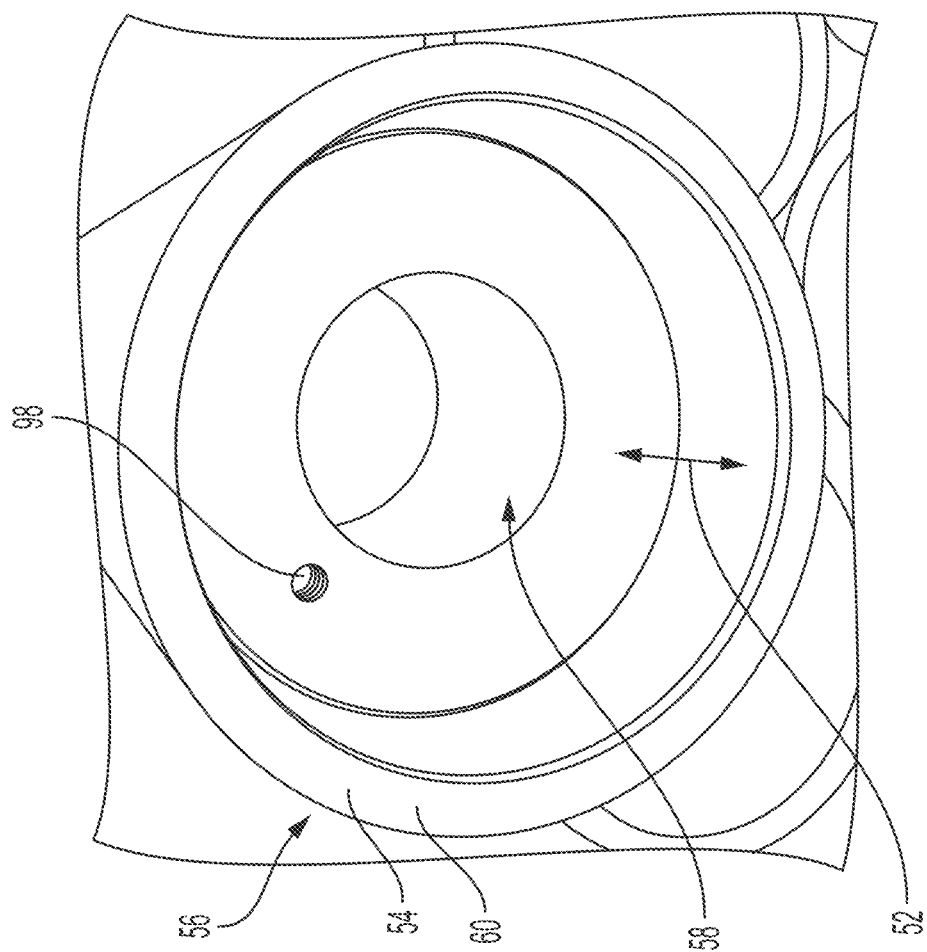
FIGS. 3A and 3B are graphs illustrating evaluation results of the electromagnetic wave attenuator.

FIGS. 3A and 3B are graphs illustrating evaluation results of the electromagnetic wave attenuator.

The horizontal axis of these figures is frequency f1. The vertical axis is attenuation performance MSE (Magnetic Shielding Effect). A large absolute value of the attenuation performance MSE value corresponds to a large attenuation of the electromagnetic wave.

FIG. 3A illustrates evaluation results of a first sample SP1 and a third sample SP3. FIG. 3B illustrates evaluation results of a second sample SP2 and the third sample SP3. The characteristics of the third sample SP3 shown in FIG. 3B are the same as the characteristics of the third sample SP3 shown in FIG. 3A.

The first sample SP1 has the above-mentioned configuration of the electromagnetic wave attenuator 10A. In the first sample SP1, the first magnetic layer 11 is a NiFeCuMo layer. The first non-magnetic layer 11N is a CrTi alloy layer. The thickness t11 is 50 nm. The thickness t11N is 5 nm. The number of repetitions of the first magnetic layer 11 and the first non-magnetic layer 11N is 55. The second magnetic layer 12 is a NiFeCuMo layer. The second non-magnetic layer 12N is a Cu layer. The thickness t12 is 100 nm. The thickness t12N is 100 nm. The number of repetitions of the second magnetic layer 12 and the second non-magnetic layer 12N is 10. The third magnetic layer 13 is a NiFeCuMo layer. The third non-magnetic layer 13N is a CrTi layer. The thickness t13 is 300 nm. The thickness t13N is 5 nm. The number of repetitions of the third magnetic layer 13 and the third non-magnetic layer 13N is 10. These layers are formed, for example, by a sputtering method.

In the second sample SP2, in the configuration of the first sample SP1 described above, the first non-magnetic layer 11N and the third non-magnetic layer 13N are Ta layers. The other configurations of the second sample SP2 are the same as those of the first sample SP1.

In the third sample SP3, the first stacked body 10M, the second stacked body 20M, and the third stacked body 30M are not provided, but a Cu layer is provided. A thickness of the Cu layer is 8 µm.

As shown in FIGS. 3A and 3B, the attenuation performance MSE obtained in the third sample SP3 is larger than that obtained in the first sample SP1 and the second sample SP2 in the high frequency range (for example, not less than 100 MHz and not more than 2 GHz or less). This is an effect of the Cu material. However, in the third sample SP3, the attenuation performance MSE is small in the low frequency region (for example, not more than 100 MHz).

As shown in FIG. 3B, in the second sample SP2, the attenuation performance MSE is larger than that of the third sample SP3 in the low frequency region. In the second sample SP2, there is a peak of the attenuation performance MSE when the frequency f1 is 40 MHz to 50 MHz.

As shown in FIG. 3A, in the first sample SP1, in the low frequency region, the attenuation performance MSE is larger than that of the third sample SP3. In the first sample SP1, the large attenuation performance MSE can be obtained in a wide range of frequencies f1 of about 15 MHz to 50 MHz. Comparing FIGS. 3A and 3B, in the first sample SP1, the attenuation performance MSE is larger than that of the second sample SP2 in a low frequency region of not more than 50 MHz. In particular, the large attenuation performance MSE can be obtained even at 20 MHz.

As described above, by using the first non-magnetic layer 11N including Cr and Ti, the large attenuation performance MSE can be obtained. According to the embodiment, it is possible to provide an electromagnetic wave attenuator with larger attenuation capability. In particular, the large attenuation performance MSE can be obtained in a low frequency region (for example, not more than 100 MHz). Electromagnetic waves in the low frequency region can be effectively attenuated.

Figure 4:
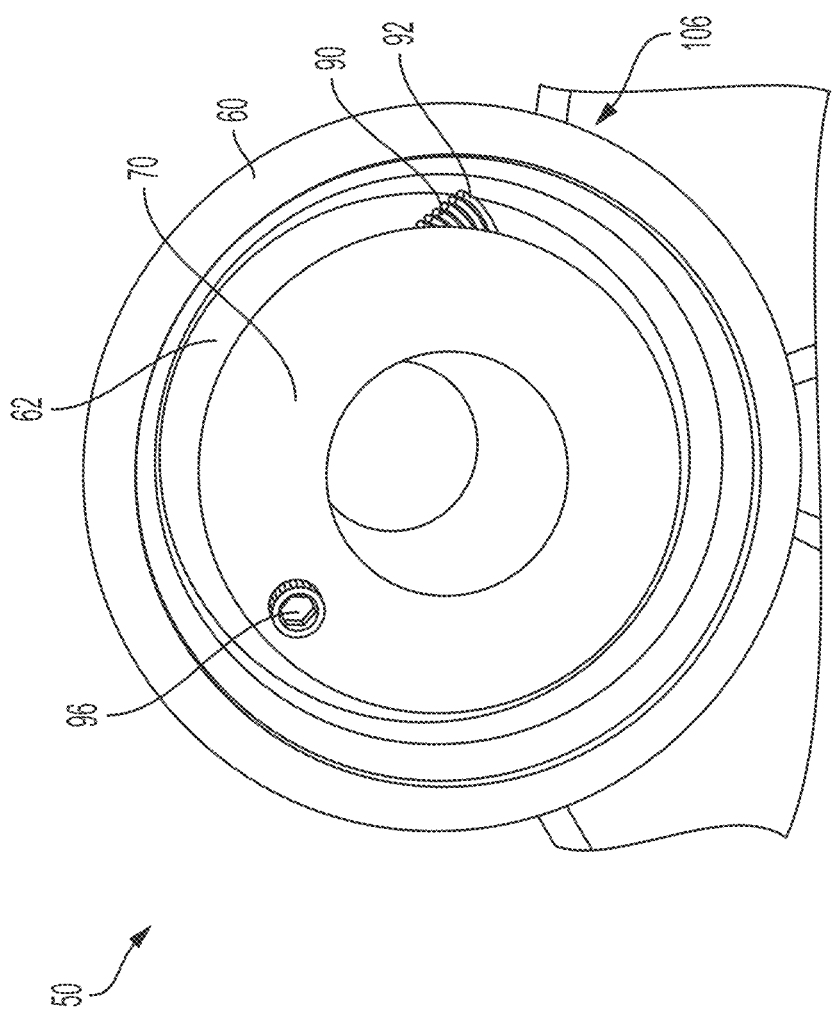
FIGS. 4A and 4B are electron microscope images of cross section of the electromagnetic wave attenuator according to the first embodiment.

FIGS. 4A and 4B are electron microscope images of cross section of the electromagnetic wave attenuator according to the first embodiment.

FIG. 4B is a magnified image of a part of FIG. 4A. These images are cross-sectional TEM (Transmission Electron Microscopy) images of the first stacked body 10M in the first sample SP1.

As shown in FIGS. 4A and 4B, the multiple first magnetic layers 11 include crystal grains (first crystal grains 11g). Crystal grains are not observed in the multiple first non-magnetic layers 11N. The multiple first non-magnetic layers 11N are amorphous. In these figures, a line of the outer shape of the cross section of the crystal grain is drawn based on the cross-sectional TEM image so that the first crystal grain 11g can be easily seen.

An amorphous first non-magnetic layer 11N is provided between one of the multiple first magnetic layers 11 and another one of the multiple first magnetic layers 11. As a result, the crystal state in each of the multiple first magnetic layers 11 is divided. For example, the size of the crystal grains (multiple first crystal grains 11g) in each of the multiple first magnetic layers 11 tends to be small. As a result, it is considered that the large attenuation performance MSE can be obtained.

For example, exchange coupling interactions align spins in a ferromagnet. For example, when the magnetic material is a polycrystalline material, this exchange coupling interaction becomes small or zero at the grain boundaries. Therefore, when an alternating magnetic field is applied to the magnetic material of the polycrystalline material, the spins in a group of crystal grains precess as one unit. It is considered that when the size of the crystal grains is small, the unit that performs this dynamic behavior becomes small, and for example, the static magnetic interaction becomes stronger. As a result, for example, it is considered that the attenuation of electromagnetic waves is improved.

In the case of a soft magnetic thin film, it is considered that good soft magnetic properties can be obtained when the crystal grain size is small. For example, when the crystal grain size is small, the coercive force is small and the magnetic permeability is large. In the embodiment, it is easy to obtain crystals having a small size. Thereby, good soft magnetic properties can be obtained. Good shielding performance can be obtained. On the other hand, the thickness of the first non-magnetic layer 11N provided between the two magnetic layers is thin. As a result, it is considered that a strong magnetostatic coupling interaction acts between the two first magnetic layers 11. As a result, it is considered that a cooperative precession occurs in the entire stacked multiple first magnetic layers 11. As a result, it is considered that a large shielding performance is obtained.

Figure 5:
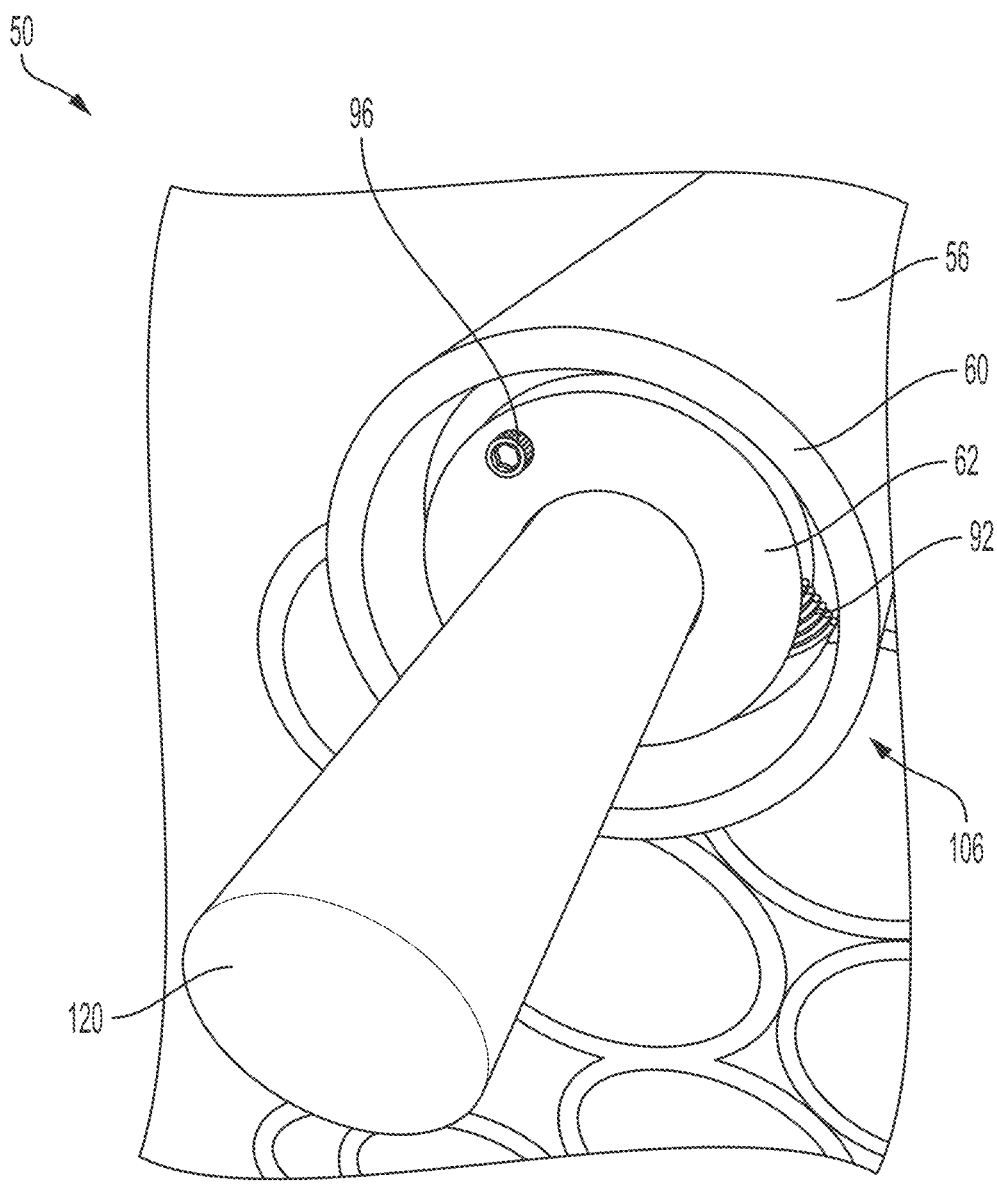
FIG. 5 is an electron microscope image of cross section of the electromagnetic wave attenuator according to the first embodiment.

FIG. 5 is an electron microscope image of cross section of the electromagnetic wave attenuator according to the first embodiment.

FIG. 5 is a cross-sectional TEM image of the first stacked body 10M and the second stacked body 20M in the first sample SP1. As shown in FIG. 5, the multiple second magnetic layers 12 include crystal grains (multiple second crystal grains 12g). The multiple first magnetic layers 11 include crystal grains (multiple first crystal grains 11g). An average diameter of the multiple second crystal grains 12g is larger than an average diameter of the multiple first crystal grains 11g. In FIG. 5, a line of the outer shape of the cross section of the crystal grain is drawn based on the cross-sectional TEM image so that the second crystal grain 12g can be easily seen.

Each of the multiple first crystal grains 11g has a first crystal grain width of 11w. The first crystal grain width 11w is a width of each of the multiple first crystal grains 11g along the vertical direction. The vertical direction is perpendicular to the first direction D1. The vertical direction is, for example, the X-axis direction. In the multiple first crystal grains 11g, the average of the first crystal grain width 11w is, for example, not less than 2 nm and not more than 20 nm.

Each of the multiple second crystal grains 12g has a second crystal grain width 12w along the above-mentioned vertical direction. In the multiple second crystal grains 12g, the average of the second crystal grain width 12w is, for example, not less than 30 nm and not more than 200 nm.

In the second stacked body 20M, the second non-magnetic layer 12N includes Cu. When the second stacked body 20M including the second non-magnetic layer 12N of Cu is provided, a large eddy current loss occurs in the Cu layer. As a result, the baseline of the shielding effect can be raised in a wide frequency range. When the second stacked body 20M including the second non-magnetic layer 12N of Cu is provided, the shielding characteristics in a wide frequency range (for example, not less than 20 MHz and not more than 6 GHz) are improved as compared with the case where the second stacked body 20M is not provided. This effect is considered to be an effect peculiar to Cu.

For example, the first stacked body 10M that can obtain the large attenuation performance MSE in a low frequency region and the second stacked body 20M that can obtain the large attenuation performance MSE in a wide frequency region are combined. As a result, the attenuation performance MSE larger than that of the third sample SP3 can be obtained in the low frequency region, and relatively large attenuation performance MSE can be obtained even in the high frequency region.

An amorphous third non-magnetic layer 13N is provided between one of the multiple third magnetic layers 13 and another one of the multiple third magnetic layers 13. As a result, the crystal in each of the multiple third magnetic layers 13 is divided. For example, the size of the crystal grains in each of the multiple third magnetic layers 13 tends to be small. As a result, it is considered that the large attenuation performance MSE is obtained.

As described with respect to FIGS. 3A and 3B, the attenuation performance MSE in the first sample SP1 (CrTi) is larger than the attenuation performance MSE in the second sample SP2 (Ta) in the low frequency region. This is considered to be related to the fact that good soft magnetic properties can be obtained by using the CrTi layer as described below.

Figure 6:
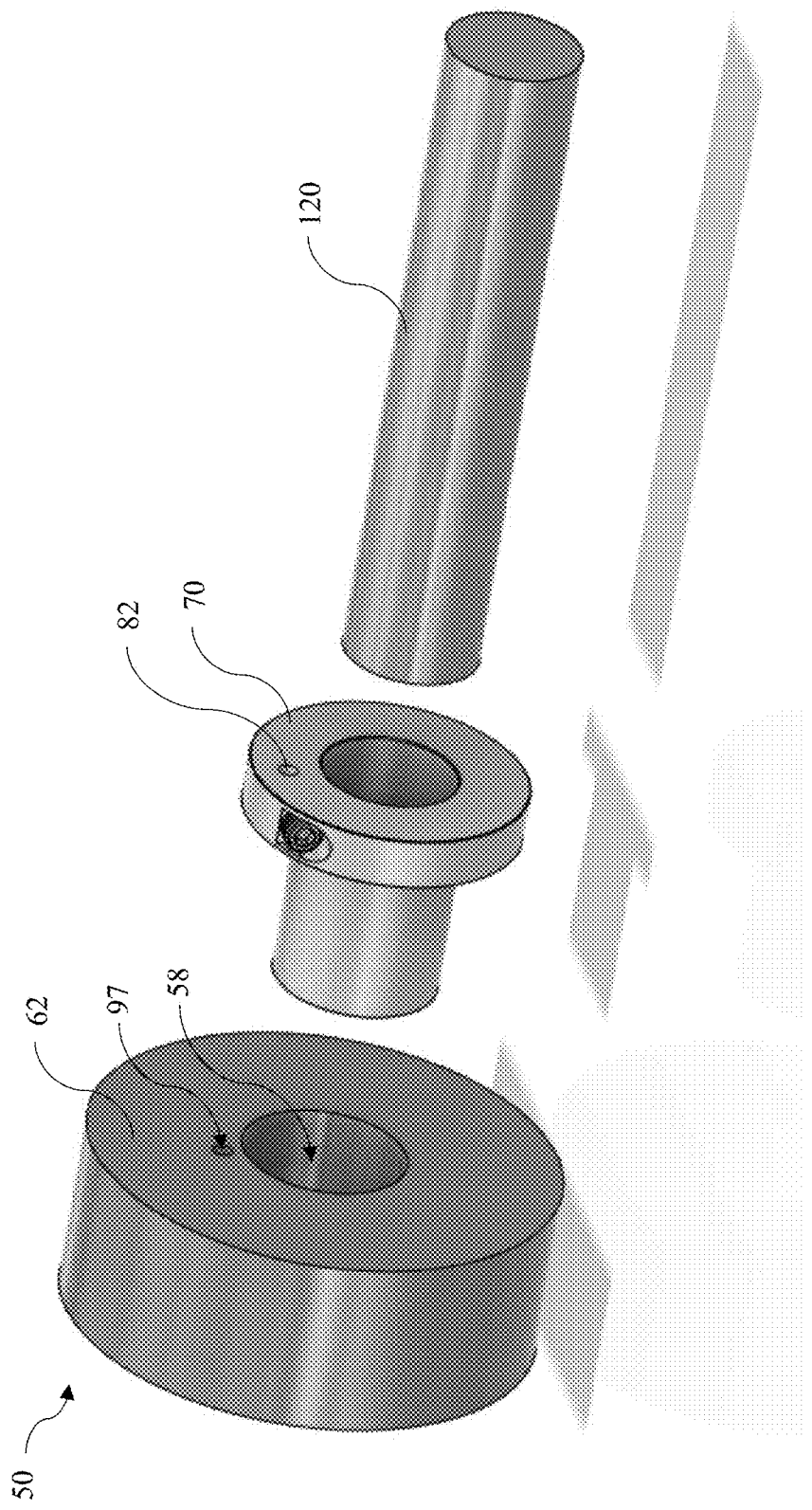
FIG. 6 is a graph illustrating characteristics of the electromagnetic wave attenuator.

FIG. 6 is a graph illustrating characteristics of the electromagnetic wave attenuator.

The horizontal axis of FIG. 6 is the magnetic field H1 applied to the electromagnetic wave attenuator. The vertical axis is the magnetization M1. The magnetization M1 is normalized. FIG. 6 shows measurement results for the first sample SP1 and the second sample SP2.

As shown in FIG. 6, the hysteresis of the first sample SP1 is smaller than that of the second sample SP2. The coercive force Hc in the first sample SP1 is about 1.4 Oe. The coercive force Hc in the second sample SP2 is about 2.4 Oe. The coercive force of the first sample SP1 including the CrTi layer is smaller than that of the second sample SP2 including the Ta layer. By using the CrTi layer, good soft magnetic properties can be obtained. The small coercive force of the CrTi layer may be due to, for example, a difference in the concentration of an unintended element (for example, residual oxygen) included in the soft magnetic layer.

In the embodiment, as described below, each of the multiple first magnetic layers 11 may have an uneven shape.

Figure 7:
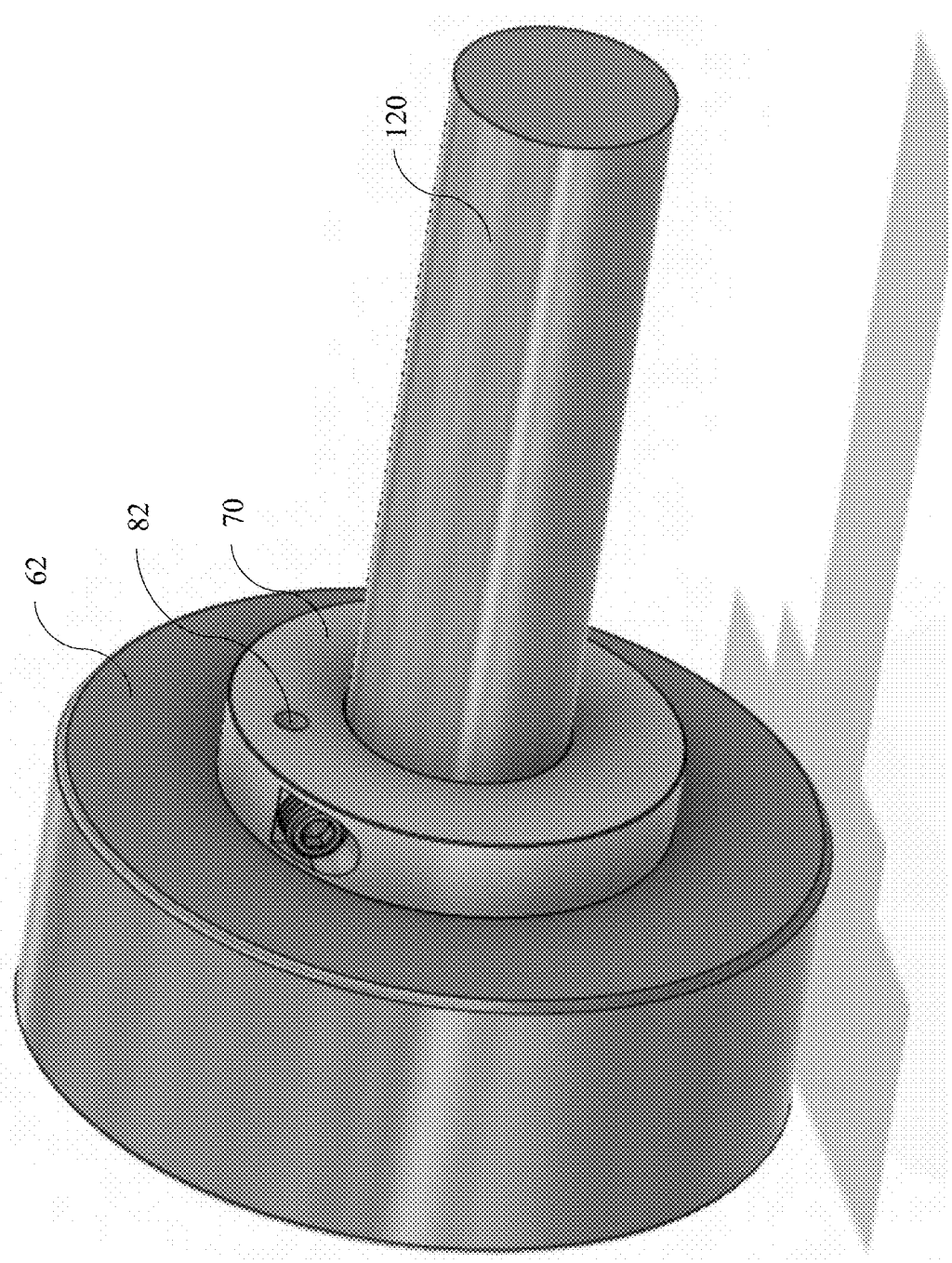
FIG. 7 is a schematic cross-sectional view illustrating the electromagnetic wave attenuator according to the embodiment.

FIG. 7 is a schematic cross-sectional view illustrating the electromagnetic wave attenuator according to the embodiment.

As shown in FIG. 7, each of the multiple first magnetic layers 11 has an uneven shape. The multiple first non-magnetic layers 11N follow the uneven shape of the multiple first magnetic layers 11.

One of the multiple first magnetic layers 11 includes a first magnetic layer surface 11fa. The first magnetic layer surface 11fa faces one of the multiple first non-magnetic layers 11N. The first magnetic layer surface 11fa includes a first top portion 11pp, a second top portion 11pq, and a first bottom portion 11dp. One direction that crosses the first direction D1 is defined as a crossing direction De2. The crossing direction De2 is, for example, the X-axis direction.

A position of the first bottom portion 11dp in the crossing direction De2 is between a position of the first top portion 11pp in the crossing direction De2 and a position of the second top portion 11pq in the crossing direction De2. At least a part of the multiple first non-magnetic layers 11N is between the first top portion 11*pp* and the second top portion 11*pq* in the crossing direction De2. A distance along the first direction D1 between the first top portion 11*pp* and the first bottom portion 11*dp* is, for example, not less than 10 nm. The distance corresponds to the height (depth) of the unevenness.

It is considered that magnetostatic interaction of magnetization can be made larger between one of the multiple first magnetic layers 11 and another one of the multiple first magnetic layers 11 by providing such an uneven shape, for example.

In the embodiment, a concentration of Cr in the multiple first non-magnetic layers 11N is, for example, not less than 30 atomic % and not more than 70 atomic %. At such a concentration, for example, good soft magnetic properties can be easily obtained.

Second Embodiment

The second embodiment relates to an electronic device. The electronic device according to the embodiment includes the electromagnetic wave attenuator according to the first embodiment and an arbitrary electronic element. The electromagnetic wave attenuator according to the first embodiment is, for example, the electromagnetic wave attenuator 10 or the electromagnetic wave attenuator 10A, or the like.

FIGS. 8A to 8D are schematic views illustrating an electronic device according to a second embodiment.

Figure 8:
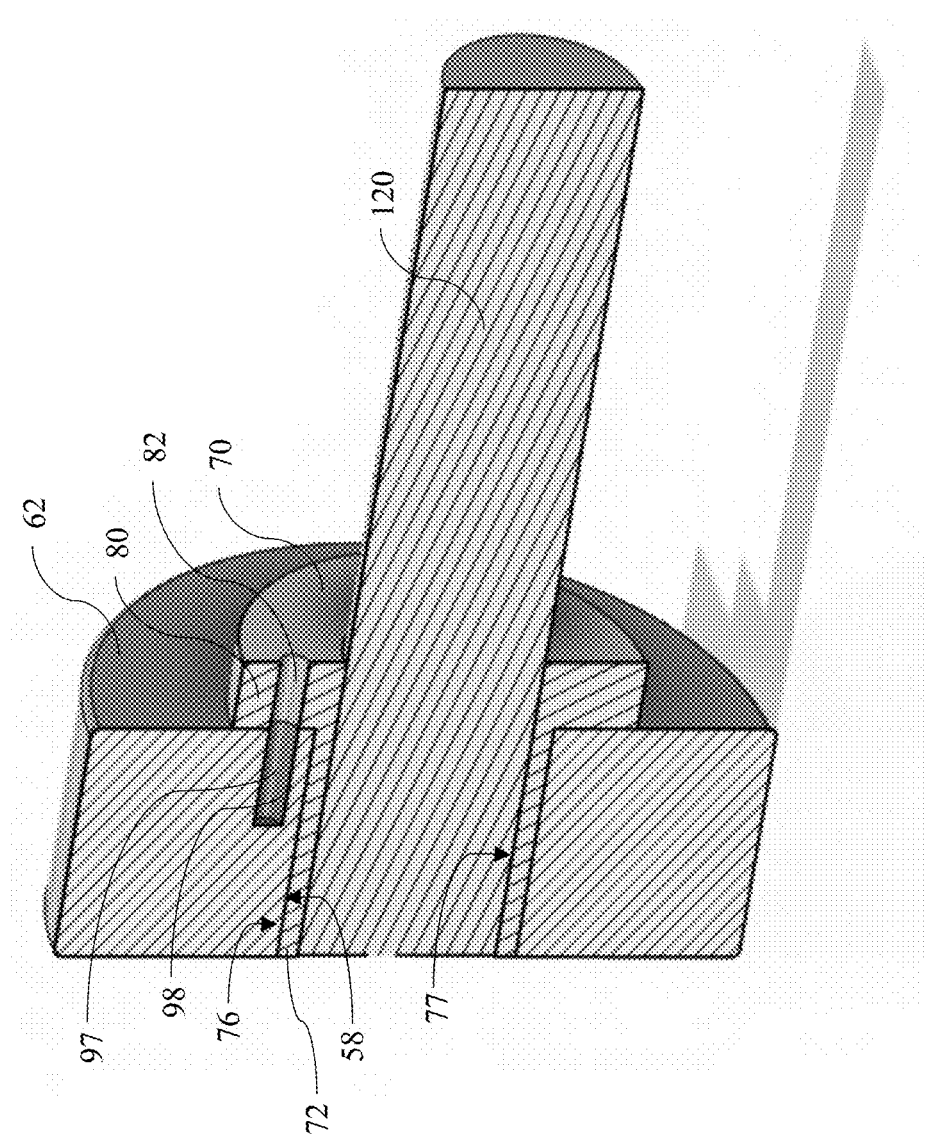
FIG. 8A, FIG. 8B, FIG. 8C, and FIG. 8D are schematic views illustrating an electronic device according to a second embodiment.

FIG. 8A is a perspective view. FIG. 8B is a line A1-A2 cross-sectional view of FIG. 8A. FIG. 8C is a line B1-B2 cross-sectional view of FIG. 8A. FIG. 8D is a plan view as viewed along arrow AA of FIG. 8A. FIG. 1 or 2 corresponds to a line C1-C2 cross section of FIG. 8B.

As shown in FIG. 8A, the electronic device 110 according to the embodiment includes an electronic element 50 and the electromagnetic wave attenuator (in the example, electromagnetic wave attenuator 10). A substrate 60 is further provided in the example. The electromagnetic wave attenuator 10 covers at least a part of the electronic element 50. The electronic element 50 is, for example, a semiconductor element.

In the example as shown in FIG. 8B, the electronic element 50 includes a semiconductor chip 50*c*, an insulating portion 50*i*, and a wire 50*w*. In the example, an electrode 50*e*, a substrate connector 50*f*, and a connector 58 are provided at the substrate 60. The wire 50*w* electrically connects the electrode 50*e* and a part of the semiconductor chip 50*c*. The electrode 50*e* and the connector 58 are electrically connected by the substrate connector 50*f*. The substrate connector 50*f* pierces the substrate 60. The connector 58 functions as an input/output portion of the semiconductor chip 50*c*. The connector 58 may be, for example, a terminal. The insulating portion 50*i* is provided around the semiconductor chip 50*c*. The insulating portion 50*i* includes, for example, at least one of a resin or a ceramic, etc. The semiconductor chip 50*c* is protected by the insulating portion 50*i*.

The electronic element 50 includes, for example, at least one of an arithmetic circuit, a control circuit, a memory circuit, a switching circuit, a signal processing circuit, or a high frequency circuit.

The base body 10*s* of the electromagnetic wave attenuator 10 (referring to FIG. 1) may be, for example, at least a part of the electronic element 50. The base body 10*s* of the electromagnetic wave attenuator 10 may be, for example, at least a part of the insulating portion 50*i*.

In the example as illustrated in FIG. 8B, the electromagnetic wave attenuator 10 is electrically connected to a terminal 50*t* provided at the substrate 60. The electromagnetic wave attenuator 10 is set to one potential (e.g., the ground potential) via the terminal 50*t*. For example, the electromagnetic wave attenuator 10 attenuates the electromagnetic waves radiated from the electronic element 50. For example, the electromagnetic wave attenuator 10 functions as a shield.

As shown in FIGS. 8A to 8C, the stacked member 10MA of the electromagnetic wave attenuator 10 includes a first planar portion 10*p*. In the example, the stacked member 10MA further includes first to fourth side surface portions 10*a* to 10*d*. A direction from the electronic element 50 to the first planar portion 10*p* is aligned with the first direction D1 (e.g., the Z-axis direction).

As shown in FIGS. 8B and 8C, the electronic element 50 is positioned between the first planar portion 10*p* and the substrate 60 in the first direction D1.

As shown in FIGS. 8C and 8D, the electronic element 50 is positioned between the first side surface portion 10*a* and the third side surface portion 10*c* in the X-axis direction.

As shown in FIGS. 8B and 8D, the electronic element 50 is positioned between the second side surface portion 10*b* and the fourth side surface portion 10*d* in the Y-axis direction.

By using the electromagnetic wave attenuator 10A described with respect to the first embodiment, for example, electromagnetic waves in the low frequency domain of not more than 100 MHz can be attenuated effectively. An electronic device can be provided in which the attenuation characteristics for electromagnetic waves can be improved.

For example, the external emission of the electromagnetic waves generated by the electronic element 50 can be suppressed. For example, the electromagnetic waves from the outside that reach the electronic element 50 can be suppressed. Stable operations are obtained easily in the electronic element 50.

The first planar portion 10*p* may be, for example, substantially a quadrilateral (including a parallelogram, a rectangle, or a square).

FIGS. 9A to 9D are schematic views illustrating parts of the electronic device according to the second embodiment.

Figure 9:
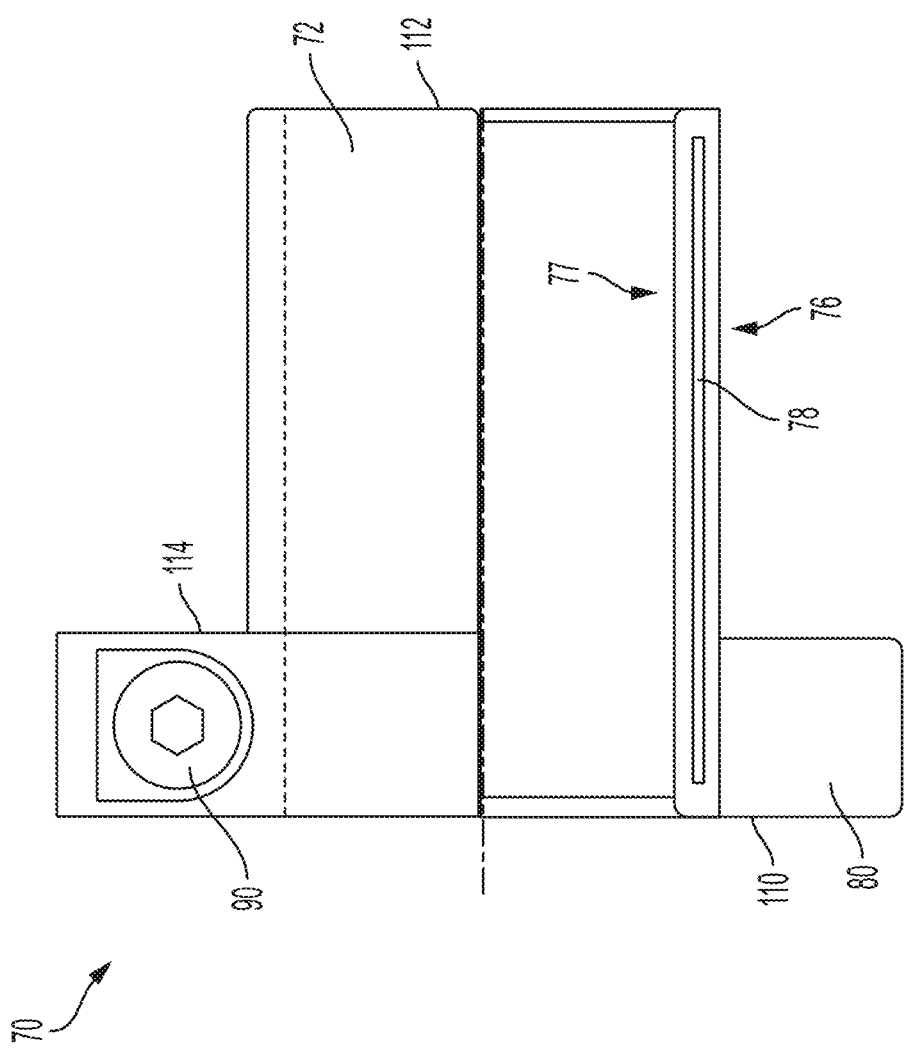
FIG. 9A, FIG. 9B, FIG. 9C, and FIG. 9D are schematic views illustrating parts of the electronic device according to the second embodiment.

As shown in FIG. 9A, the first side surface portion 10*a* of the electromagnetic wave attenuator 10 includes the multiple first magnetic layers 11 and the multiple first non-magnetic layers 11N. The stacking direction of the multiple first magnetic layers 11 and the multiple first non-magnetic layers 11N in the first side surface portion 10*a* is a second direction D2.

As shown in FIG. 9B, the second side surface portion 10*b* of the electromagnetic wave attenuator 10 includes the multiple first magnetic layers 11 and the multiple first non-magnetic layers 11N. The stacking direction of the multiple first magnetic layers 11 and the multiple first non-magnetic layers 11N in the second side surface portion 10*b* is a third direction D3.

As shown in FIG. 9C, the third side surface portion 10*c* of the electromagnetic wave attenuator 10 includes the multiple first magnetic layers 11 and the multiple first non-magnetic layers 11N. The stacking direction of the multiple first magnetic layers 11 and the multiple first non-magnetic layers 11N in the third side surface portion 10*c* is the second direction D2.

As shown in FIG. 9D, the fourth side surface portion 10*d* of the electromagnetic wave attenuator 10 includes the multiple first magnetic layers 11 and the multiple first non-magnetic layers 11N. The stacking direction of the multiple first magnetic layers 11 and the multiple first non-magnetic layers 11N in the fourth side surface portion 10d is the third direction D3.

The first magnetic layers 11 that are included in the first to fourth side surface portions 10a to 10d each may be continuous with the first magnetic layer 11 included in the first planar portion 10p. The first non-magnetic layers 11N that are included in the first to fourth side surface portions 10a to 10d each may be continuous with the first non-magnetic layer 11N included in the first planar portion 10p.

Thus, the electronic device 110 according to the embodiment includes the electronic element 50 and the electromagnetic wave attenuator 10 according to the first embodiment. For example, a direction from the electronic element 50 to the electromagnetic wave attenuator 10 is the first direction.

As described above, the stacked member 10MA may further include the first side surface portion 10a (see FIG. 9A). The first side surface portion 10a includes a first side surface stacked body 10aM. The first side surface stacked body 10aM includes multiple first side surface magnetic layers 11s and multiple first side surface non-magnetic layers 11sN. The multiple first side surface non-magnetic layers 11sN include Cr and Ti. The multiple first side surface magnetic layers 11s correspond to the multiple first magnetic layers 11 in the first planar portion 10p. The multiple first side surface non-magnetic layers 11sN correspond to the multiple first non-magnetic layers 11N in the first planar portion 10p.

A direction from one of the multiple first side surface magnetic layers 11s to another of the multiple first side surface magnetic layers 11s is along the second direction D2 crossing the first direction D1. One of the multiple first side surface non-magnetic layers 11sN is between one of the multiple first side surface magnetic layers 11s and another one of the multiple first side surface magnetic layers 11s. One of the multiple first side surface magnetic layers 11s is between one of the multiple first side surface non-magnetic layers 11sN and another one of the multiple first side surface non-magnetic layers 11sN.

One of the multiple first side surface non-magnetic layers 11sN includes an amorphous region. One of the multiple first side surface magnetic layers 11s and another one of the multiple first side surface magnetic layers 11s include a crystal region.

For example, the electromagnetic wave attenuator 10 includes multiple regions (or multiple portions). At least a part of the electronic element 50 is provided between the multiple regions. The multiple electromagnetic wave attenuation bodies 10 may be provided. The multiple electromagnetic wave attenuators 10 correspond to, for example, the first planar portion 10p and the first to fourth side surface portions 10a to 10d. For example, at least a part of the electronic element 50 may be provided between the multiple electromagnetic wave attenuation bodies 10.

FIGS. 10 to 15 are schematic cross-sectional views illustrating electronic devices according to the second embodiment.

Figure 10:
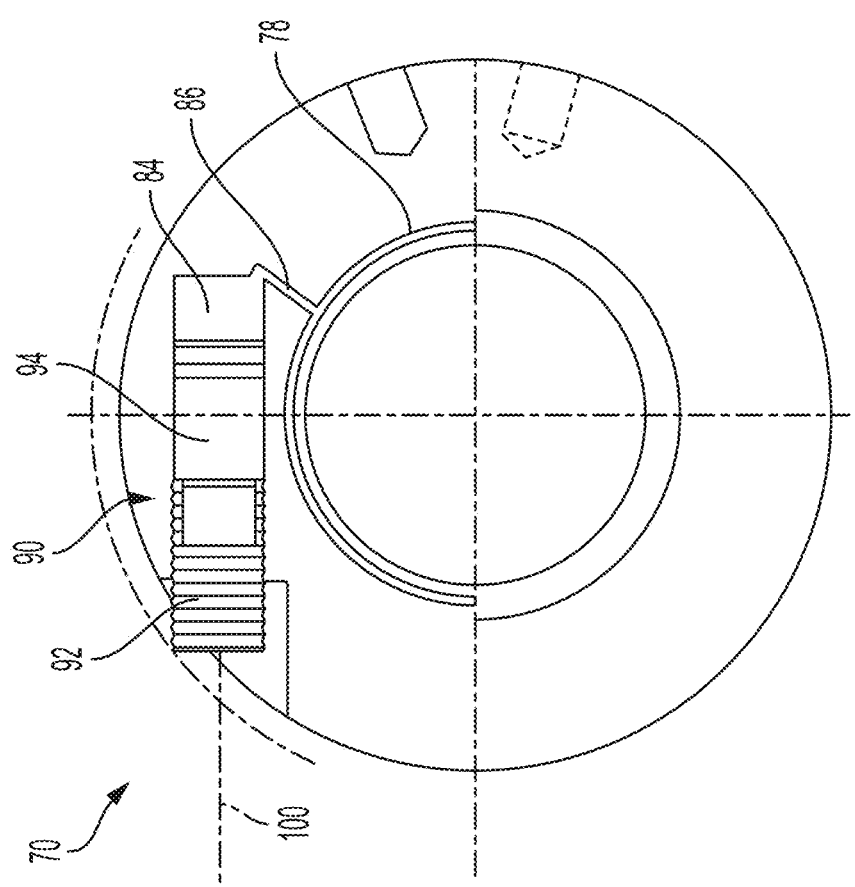
FIG. 10 is a schematic cross-sectional view illustrating an electronic device according to the second embodiment.

As shown in FIG. 10, an electronic device 111 according to the embodiment includes the electromagnetic wave attenuator 10 and multiple electronic elements (electronic elements 51, 51B, 52, 53, 53B, 53C, etc.).

The electronic elements are provided between the multiple regions of the electromagnetic wave attenuator 10. An insulating region (insulating portions 41 and 42, etc.) may be provided between the electronic element and one of the multiple regions of the electromagnetic wave attenuator 10.

A resin portion (resin portions 511, 521, 531, etc.) may be provided between the electronic element and the insulating region (the insulating portions 41 and 42, etc.). A connection member (connection members 51N, 52N, 53N, etc.) may be provided for each of the multiple electronic elements. For example, the electronic element and the connector 58 may be electrically connected by the connection member.

Figure 11:
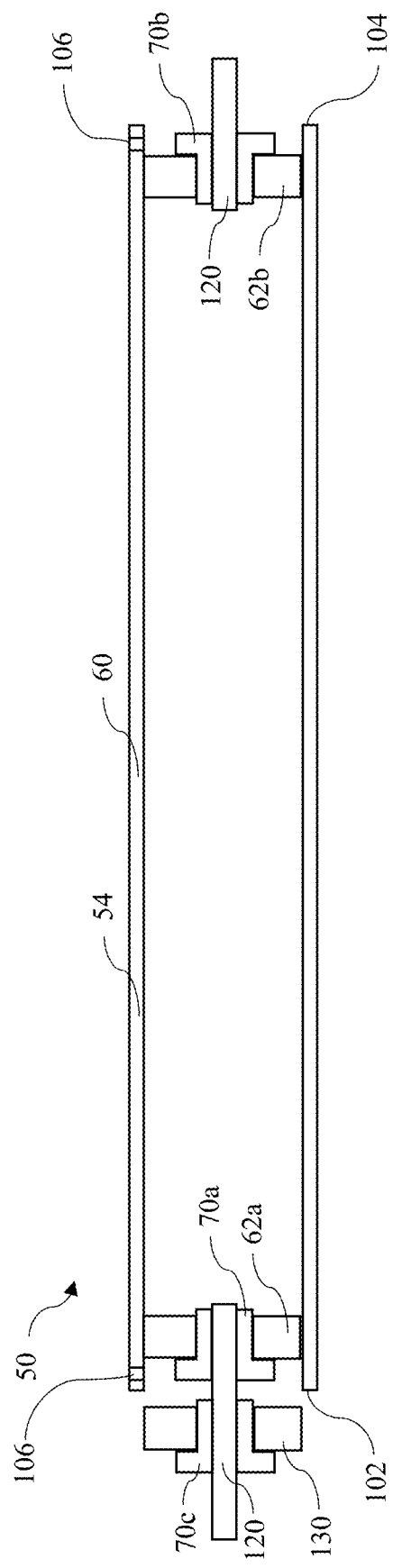
FIG. 11 is a schematic cross-sectional view illustrating an electronic device according to the second embodiment.

As in an electronic device 112 shown in FIG. 11, the connection member 51N may be sunk into a substrate 55. In the electronic device 112, the electromagnetic wave attenuator 10 is provided between the multiple electronic elements. For example, it is suppressed that the electromagnetic waves generated by one of the multiple electronic elements is incident on another one of the multiple electronic elements.

Figure 12:
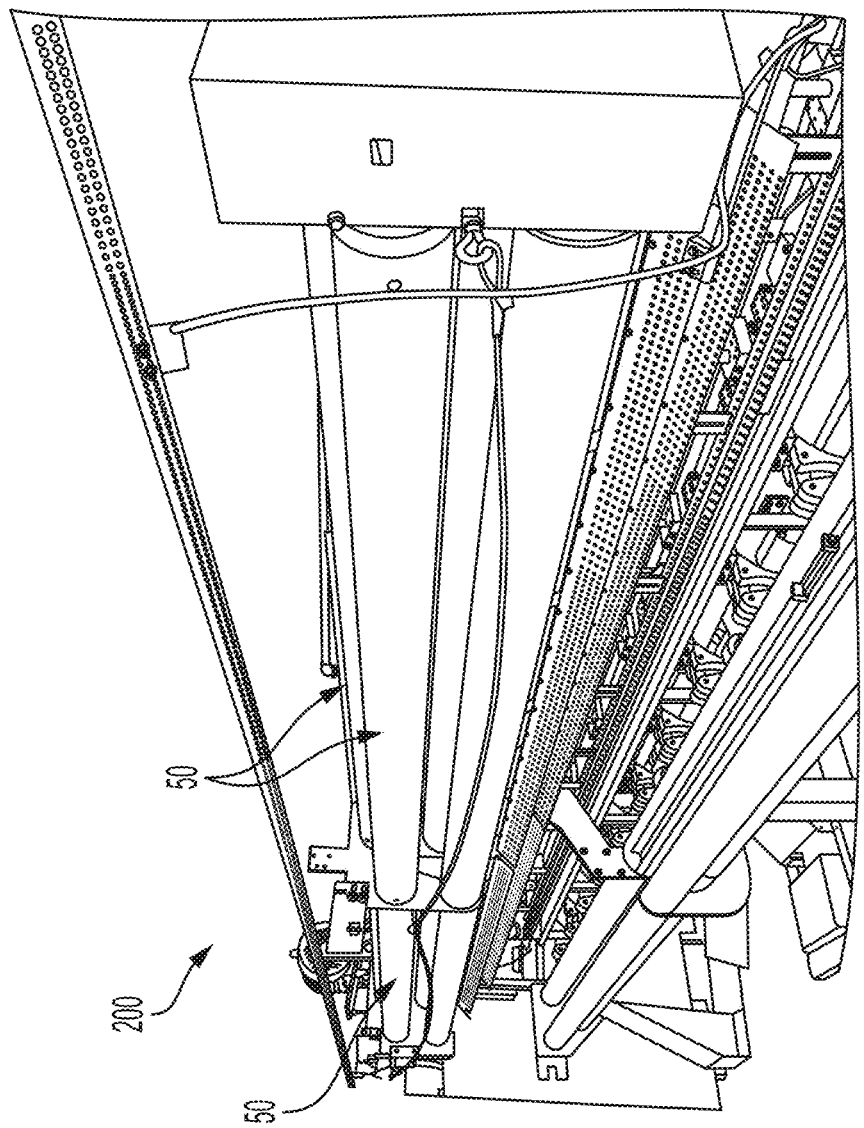
FIG. 12 is a schematic cross-sectional view illustrating an electronic device according to the second embodiment.

As in an electronic device 113 shown in FIG. 12, a mounting member 220 may be provided. The mounting member 220 includes the substrate 55 and the electromagnetic wave attenuator 10. The electronic elements (electronic elements 51 and 51B) are provided between the mounting member 220 and another electromagnetic wave attenuator 10.

Figure 13:
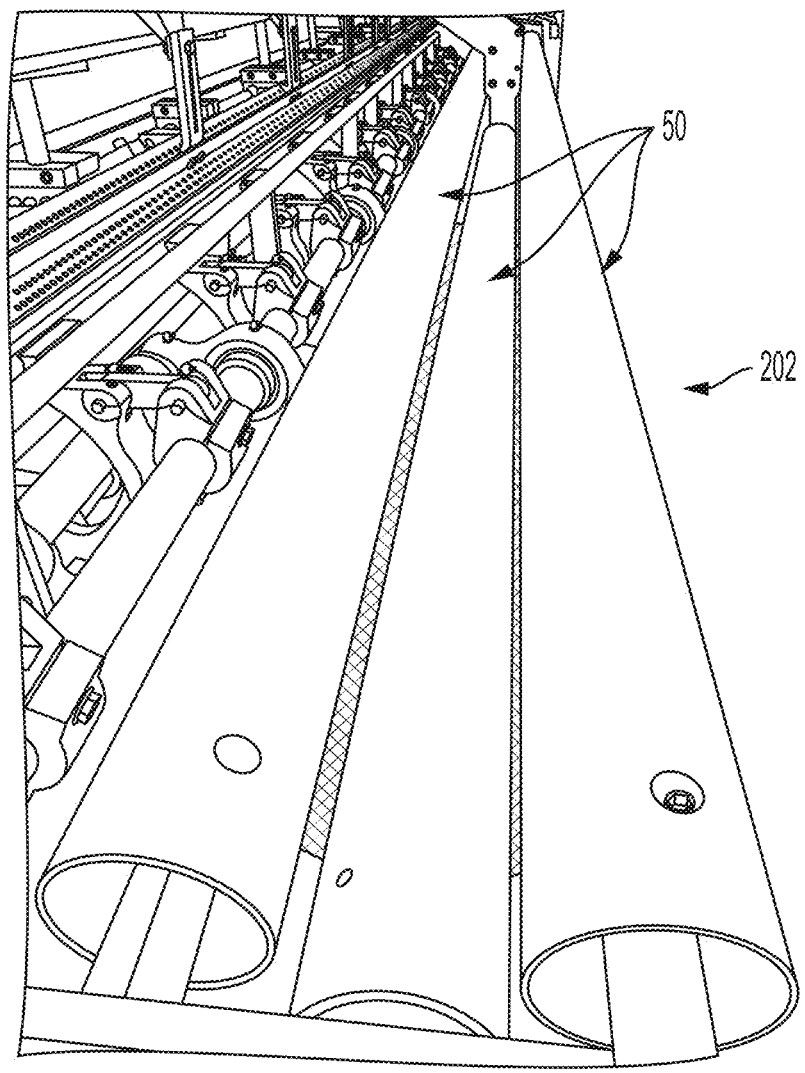
FIG. 13 is a schematic cross-sectional view illustrating an electronic device according to the second embodiment.

As in an electronic device 114 shown in FIG. 13, the electromagnetic wave attenuator 10 may be provided at the side surface of the electronic element 51. The side surface crosses the X-Y plane.

Figure 14:
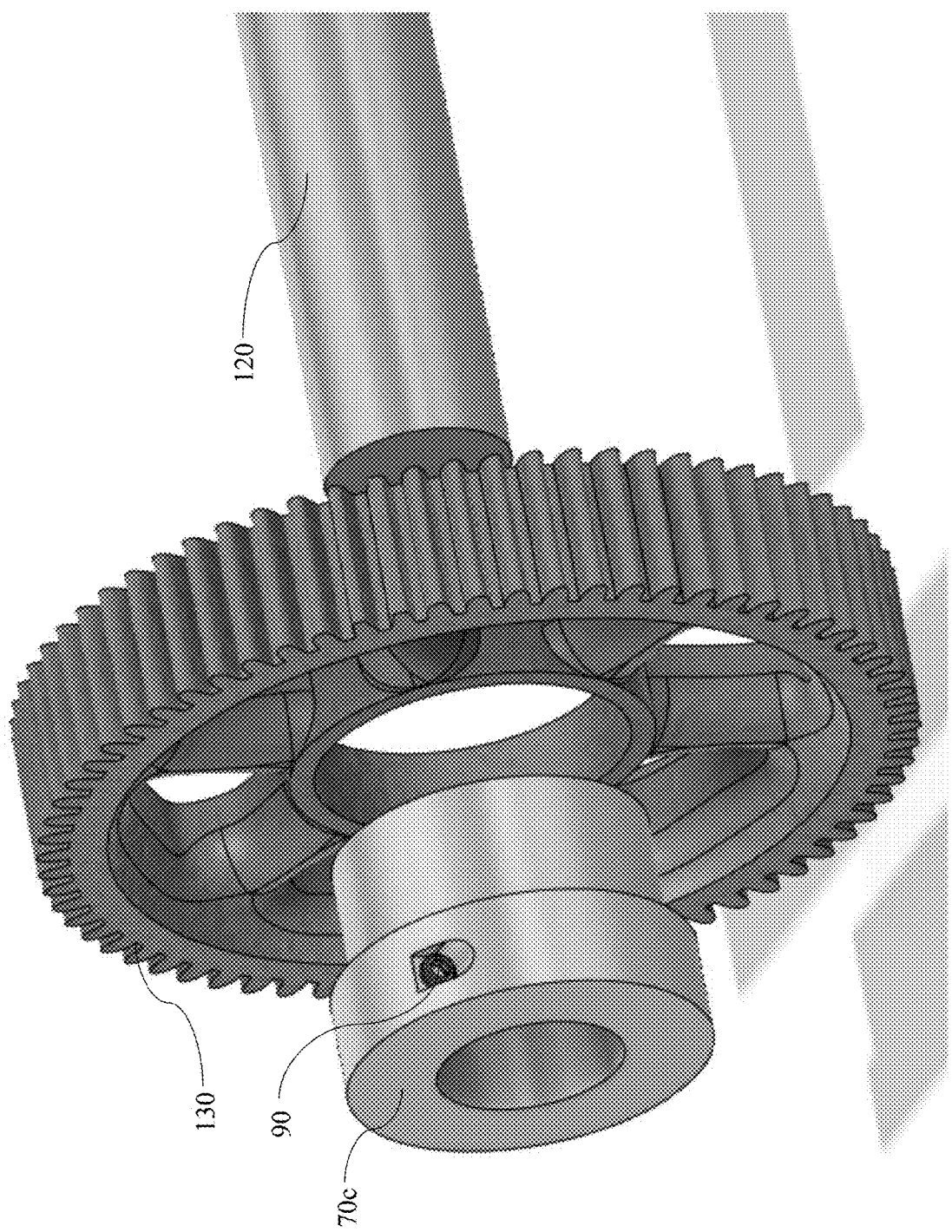
FIG. 14 is a schematic cross-sectional view illustrating an electronic device according to the second embodiment.

As in an electronic device 115 shown in FIG. 14, the electromagnetic wave attenuator 10 may be provided to continuously surround the multiple electronic elements (electronic elements 51 and 52).

Figure 15:
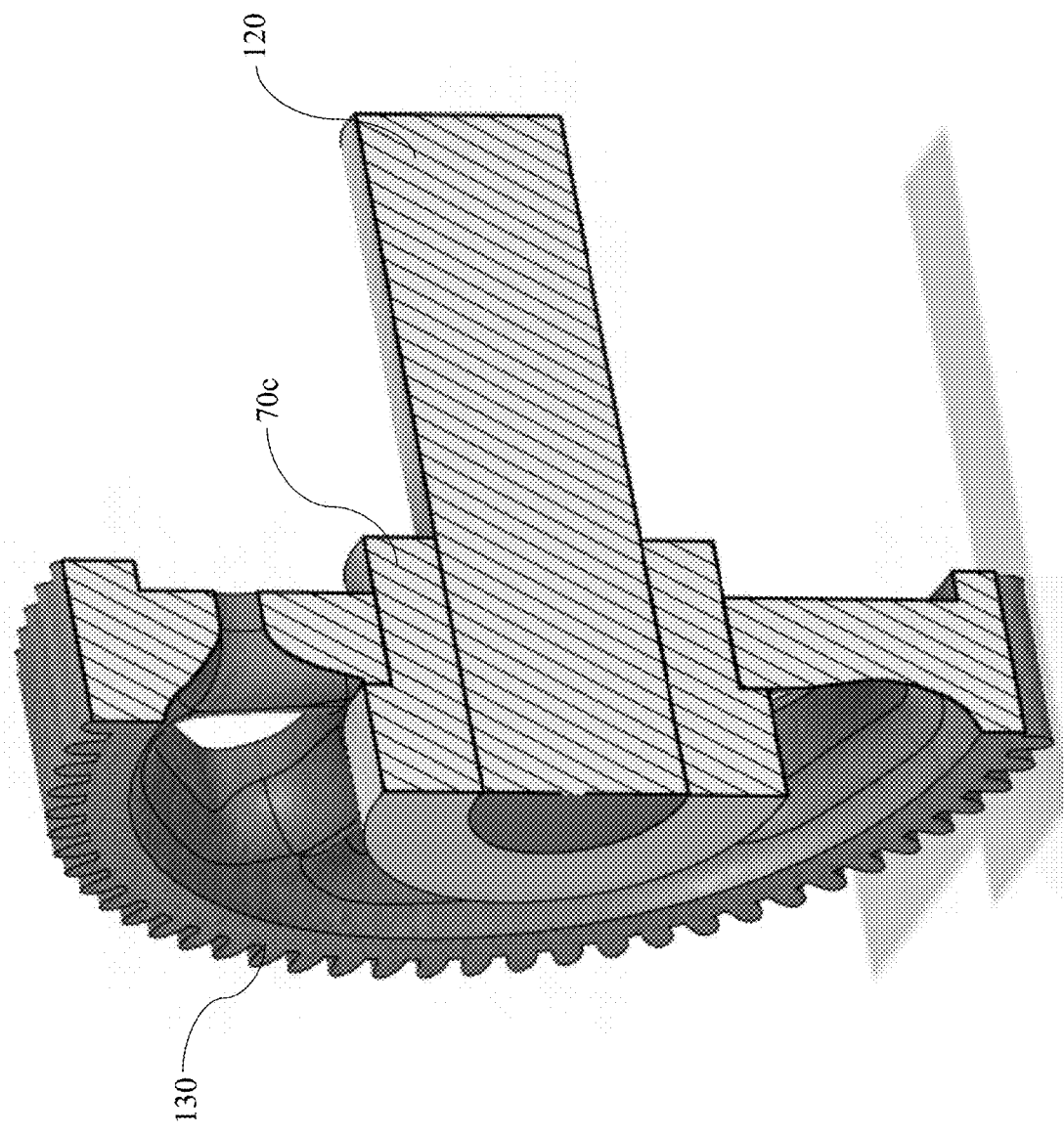
FIG. 15 is a schematic cross-sectional view illustrating an electronic device according to the second embodiment.

As in an electronic device 116 shown in FIG. 15, one of the multiple electronic elements (electronic element 51) is provided between the multiple regions of the electromagnetic wave attenuator 10. Another one of the multiple electronic elements electronic element 52) may not be provided between the multiple regions of the electromagnetic wave attenuator 10.

According to the electronic devices 111 to 116 as well, an electronic device can be provided in which the attenuation characteristics for electromagnetic waves can be improved.

For example, the embodiments are applicable to an electronic device and an electromagnetic wave attenuator for EMC (Electro Magnetic Compatibility).

The embodiments may include the following configurations (e.g., technological proposals).

Configuration 1

An electromagnetic wave attenuator, comprising:
a stacked member including a first planar portion,
the first planar portion including a first stacked body,
the first stacked body including a plurality of non-magnetic layers including Cr and Ti, and a plurality of first magnetic layers,
a direction from one of the plurality of first magnetic layers to an other one of the plurality of first magnetic layers being along a first direction,
one of the plurality of non-magnetic layers being between the one of the plurality of first magnetic layers and the other one of the plurality of first magnetic layers,
the one of the first non-magnetic layers including an amorphous region, and
the one of the plurality of first magnetic layers and the other one of the plurality of first magnetic layers including a crystal region.

Configuration 2

The electromagnetic wave attenuator according to Configuration 1, wherein
the one of the plurality of first non-magnetic layers is in contact with the one of the plurality of first magnetic layers and the other one of the plurality of the first magnetic layers.

Configuration 3

The electromagnetic wave attenuator according to Configuration 1 or 2, wherein
a thickness of the one of the plurality of first non-magnetic layers along the first direction is not less than 1 nm and not more than 10 nm.

Configuration 4

The electromagnetic wave attenuator according to any one of Configurations 1 to 3, wherein
a thickness of the one of the plurality of first magnetic layers along the first direction is not less than 10 nm and not more than 500 nm.

Configuration 5

The electromagnetic wave attenuator according to any one of Configurations 1 to 4, wherein
the plurality of first magnetic layers include at least one selected from the group consisting of Fe, Ni and Co.

Configuration 6

The electromagnetic wave attenuator according to any one of Configurations 1 to 5, wherein
the first planar portion further includes a second stacked body,
a direction from the first stacked body to the second stacked body is along the first direction,
the second stacked body includes a plurality of second non-magnetic layers including Cu, and a plurality of second magnetic layers,
a direction from one of the plurality of second magnetic layers to an other one of the plurality of second magnetic layers is along the first direction, and
one of the plurality of second non-magnetic layers is between the one of the plurality of second magnetic layers and the other one of the plurality of second magnetic layers.

Configuration 7

The electromagnetic wave attenuator according to Configuration 6, wherein
the one of the plurality of second non-magnetic layers is in contact with the one of the plurality of second magnetic layers and the other one of the plurality of second magnetic layers.

Configuration 8

The electromagnetic wave attenuator according to Configuration 6 or 7, wherein
a thickness of the one of the plurality of second non-magnetic layers along the first direction is not less than 50 nm and not more than 200 nm.

Configuration 9

The electromagnetic wave attenuator according to any one of Configurations 6 to 8, wherein
a thickness of the one of the plurality of second magnetic layers along the first direction is not less than 50 nm and not more than 200 nm.

Configuration 10

The electromagnetic wave attenuator according to any one of Configurations 6 to 9, wherein
the plurality of second magnetic layers include at least one selected from the group consisting of Fe, Ni and Co.

Configuration 11

The electromagnetic wave attenuator according to any one of Configurations 6 to 10, wherein
the one of the plurality of first magnetic layers includes a plurality of first crystal grains,
the one of the plurality of second magnetic layers includes a plurality of second crystal grains, and
an average diameter of the plurality of second crystal grains is larger than an average diameter of the plurality of first crystal grains.

Configuration 12

The electromagnetic wave attenuator according to Configuration 11, wherein
each of the plurality of first crystal grains has a first crystal grain width along a vertical direction perpendicular to the first direction,
an average of the first crystal grain width is not less than 2 nm and not more than 20 nm in the plurality of first crystal grains,
each of the plurality of second crystal grains has a second crystal grain width along the vertical direction, and
an average of the second crystal grain width is not less than 30 nm and not more than 200 nm in the plurality of second crystal grains.

Configuration 13

The electromagnetic wave attenuator according to any one of Configurations 1 to 12, wherein
the first planar portion includes a third stacked body,
the third stacked body includes a plurality of third magnetic layers and a plurality of third non-magnetic layers,
a direction from one of the plurality of third magnetic layers to an other one of the plurality of third magnetic layers is along the first direction,
one of the plurality of third non-magnetic layers is between the one of the plurality of third magnetic layers and the other one of the plurality of third magnetic layers, and
the plurality of third non-magnetic layers include at least one selected from the group consisting of Cr, Cu, Ta, Ti, W, Mo, Nb and Hf.

Configuration 14

The electromagnetic wave attenuator according to Configuration 13, wherein
the one of the plurality of third non-magnetic layers is in contact with the one of the plurality of third magnetic layers and the other one of the plurality of third magnetic layers.

Configuration 15

The electromagnetic wave attenuator according to Configuration 13 or 14, wherein
the one of the plurality of third non-magnetic layers includes an amorphous region, and
the one of the plurality of third magnetic layers and the other one of the plurality of third magnetic layers include a crystal region.

Configuration 16

The electromagnetic wave attenuator according to any one of Configurations 1 to 15, wherein
the one of the plurality of first magnetic layers includes a first magnetic layer surface facing the one of the plurality of non-magnetic layers,
the first magnetic layer surface includes a first top portion, a second top portion, and a first bottom portion,
a position of the first bottom portion in a crossing direction crossing the first direction is between a position of the first top portion in the crossing direction and a position of the second top portion in the crossing direction, and at least a part of the one of the plurality of first non-magnetic layers is between the first top portion and the second top portion in the crossing direction.

Configuration 17

The electromagnetic wave attenuator according to any one of Configurations 1 to 16, further comprising:

a base body, a direction from the base body to the first planar portion being along the first direction.

Configuration 18

The electromagnetic wave attenuator according to Configuration 17, wherein the base body includes a resin.

Configuration 19

The electromagnetic wave attenuator according to any one of Configurations 1 to 18, wherein the stacked member further includes a first side surface portion, the first side surface portion includes a first side surface stacked body, the first side surface stacked body includes a plurality of first side surface non-magnetic layers including Cr and Ti, and a plurality of first side surface magnetic layers, a direction from one of the plurality of first side surface magnetic layers to an other one of the plurality of first side surface magnetic layers is along a second direction crossing the first direction, one of the plurality of first side surface non-magnetic layers is between the one of the plurality of first side surface magnetic layers and the other one of the plurality of first side surface magnetic layers, the one of the plurality of first side surface non-magnetic layers includes an amorphous region, and the one of the plurality of first side surface magnetic layers and the other one of the plurality of first side surface magnetic layers include a crystal region.

Configuration 20

An electronic device, comprising:

the electromagnetic wave attenuator according to any one of Configurations 1 to 19; and an electronic element.

According to the embodiment, an electromagnetic wave attenuator and an electronic device can be provided in which attenuation characteristics of the electromagnetic wave can be improved.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in electromagnetic wave attenuators such as stacked bodies, magnetic layers, nonmagnetic layers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all electromagnetic wave attenuators, and electronic devices practicable by an appropriate design modification by one skilled in the art based on the electromagnetic wave attenuators, and the electronic devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An electromagnetic wave attenuator, comprising:

a stacked member including a first planar portion, the first planar portion including a first stacked body, the first stacked body including a plurality of first non-magnetic layers including Cr and Ti, and a plurality of first magnetic layers, a direction from one of the first magnetic layers to an other one of the first magnetic layers being along a first direction, one of the first non-magnetic layers being between the one of the first magnetic layers and the other one of the first magnetic layers, the one of the first non-magnetic layers including an amorphous region, and the one of the first magnetic layers and the other one of the first magnetic layers including a crystal region, wherein the first planar portion further includes a second stacked body, a direction from the first stacked body to the second stacked body is along the first direction, the second stacked body includes a plurality of second non-magnetic layers including Cu, and a plurality of second magnetic layers, a direction from one of the second magnetic layers to an other one of the second magnetic layers is along the first direction, and one of the second non-magnetic layers is between the one of the second magnetic layers and the other one of the second magnetic layers, the one of the first magnetic layers includes a plurality of first crystal grains, the one of the second magnetic layers includes a plurality of second crystal grains, and an average diameter of the second crystal grains is larger than an average diameter of the first crystal grains.

2. The attenuator according to claim 1, wherein the one of the first non-magnetic layers is in contact with the one of the first magnetic layers and the other one of the first magnetic layers.

3. The attenuator according to claim 1, wherein a thickness of the one of the first non-magnetic layers along the first direction is not less than 1 nm and not more than 10 nm.

4. The attenuator according to claim 1, wherein
a thickness of the one of the first magnetic layers along the first direction is not less than 10 nm and not more than 500 nm.

5. The attenuator according to claim 1, wherein
the first magnetic layers include at least one selected from the group consisting of Fe, Ni and Co.

6. The attenuator according to claim 1, wherein the one of the second non-magnetic layers is in contact with the one of the second magnetic layers and the other one of the second magnetic layers.

7. The attenuator according to claim 1, wherein a thickness of the one of the second non-magnetic layers along the first direction is not less than 50 nm and not more than 200 nm.

8. The attenuator according to claim 1, wherein a thickness of the one of the second magnetic layers along the first direction is not less than 50 nm and not more than 200 nm.

9. The attenuator according to claim 1, wherein the second magnetic layers include at least one selected from the group consisting of Fe, Ni and Co.

10. The attenuator according to claim 1, wherein
each of the first crystal grains has a first crystal grain width along a vertical direction perpendicular to the first direction,
an average of the first crystal grain width is not less than 2 nm and not more than 20 nm in the first crystal grains,
each of the second crystal grains has a second crystal grain width along the vertical direction, and
an average of the second crystal grain width is not less than 30 nm and not more than 200 nm in the second crystal grains.

11. The attenuator according to claim 1, wherein
the first planar portion includes a third stacked body,
the third stacked body includes a plurality of third magnetic layers and a plurality of third non-magnetic layers,
a direction from one of the third magnetic layers to an other one of the third magnetic layers is along the first direction,
one of the third non-magnetic layers is between the one of the third magnetic layers and the other one of the third magnetic layers, and
the third non-magnetic layers include at least one selected from the group consisting of Cr, Cu, Ta, Ti, W, Mo, Nb and Hf.

12. The attenuator according to claim 11, wherein
the one of the third non-magnetic layers is in contact with the one of the third magnetic layers and the other one of the third magnetic layers.

13. The attenuator according to claim 11, wherein
the one of the third non-magnetic layers includes an amorphous region, and
the one of the third magnetic layers and the other one of the third magnetic layers include a crystal region.

14. The attenuator according to claim 1, wherein
the one of the first magnetic layers includes a first magnetic layer surface facing the one of the first non-magnetic layers,
the first magnetic layer surface includes a first top portion, a second top portion, and a first bottom portion,
a position of the first bottom portion in a crossing direction crossing the first direction is between a position of the first top portion in the crossing direction and a position of the second top portion in the crossing direction, and
at least a part of the one of the first non-magnetic layers is between the first top portion and the second top portion in the crossing direction.

15. The attenuator according to claim 1, further comprising:
a base body,
a direction from the base body to the first planar portion being along the first direction.

16. The attenuator according to claim 15, wherein
the base body includes a resin.

17. The attenuator according to claim 1, wherein
the stacked member further includes a first side surface portion,
the first side surface portion includes a first side surface stacked body,
the first side surface stacked body includes a plurality of first side surface non-magnetic layers including Cr and Ti, and a plurality of first side surface magnetic layers,
a direction from one of the first side surface magnetic layers to an other one of the first side surface magnetic layers is along a second direction crossing the first direction,
one of the first side surface non-magnetic layers is between the one of the first side surface magnetic layers and the other one of the first side surface magnetic layers,
the one of the first side surface non-magnetic layers includes an amorphous region, and
the one of the first side surface magnetic layers and the other one of the first side surface magnetic layers include a crystal region.

18. An electronic device, comprising:
the attenuator according to claim 1; and
an electronic element.

19. An electromagnetic wave attenuator, comprising:
a stacked member including a first planar portion,
the first planar portion including a first stacked body,
the first stacked body including a plurality of first non-magnetic layers including Cr and Ti, and a plurality of first magnetic layers,
a direction from one of the first magnetic layers to an other one of the first magnetic layers being along a first direction,
one of the first non-magnetic layers being between the one of the first magnetic layers and the other one of the first magnetic layers,
the one of the first non-magnetic layers including an amorphous region, and
the one of the first magnetic layers and the other one of the first magnetic layers including a crystal region,
wherein
the stacked member further includes a first side surface portion,
the first side surface portion includes a first side surface stacked body,
the first side surface stacked body includes a plurality of first side surface non-magnetic layers including Cr and Ti, and a plurality of first side surface magnetic layers,
a direction from one of the first side surface magnetic layers to an other one of the first side surface magnetic layers is along a second direction crossing the first direction,
one of the first side surface non-magnetic layers is between the one of the first side surface magnetic layers and the other one of the first side surface magnetic layers, the one of the first side surface non-magnetic layers includes an amorphous region, and the one of the first side surface magnetic layers and the other one of the first side surface magnetic layers include a crystal region.

* * * * *